United States Patent [19]

Giannuzzi

[11] Patent Number: 4,892,429
[45] Date of Patent: Jan. 9, 1990

[54] ROOF ANCHOR AND STRESS PLATE ASSEMBLY

[76] Inventor: Louis N. Giannuzzi, 59 Dingletown Rd., Greenwich, Conn. 06830

[21] Appl. No.: 215,307

[22] Filed: Jul. 5, 1988

Related U.S. Application Data

[63] Continuation-in-part of Ser. No. 81,016, Aug. 3, 1987.

[51] Int. Cl.⁴ ............................................. F16B 25/06
[52] U.S. Cl. .................................... 411/383; 411/387; 411/395; 411/411; 411/426
[58] Field of Search ................... 411/24, 26, 178, 371, 411/383, 386, 387, 395–397, 411, 426, 919

[56] References Cited

U.S. PATENT DOCUMENTS

| | | | |
|---|---|---|---|
| 438,754 | 10/1890 | Rogers | 411/426 X |
| 1,286,862 | 12/1918 | Williams | 411/371 |
| 2,070,851 | 2/1937 | Woodley | 411/426 |
| 3,911,781 | 10/1975 | Bappert | 411/178 X |
| 4,074,501 | 2/1978 | Sandquist | 52/741 |
| 4,288,951 | 9/1981 | Carlson | 52/94 |
| 4,574,551 | 3/1986 | Giannuzzi | 52/512 |
| 4,601,625 | 7/1986 | Ernst et al. | 411/387 |
| 4,642,012 | 2/1987 | Blucher | 411/371 |

FOREIGN PATENT DOCUMENTS

| | | | |
|---|---|---|---|
| 674020 | 1/1930 | France | 411/397 |
| 17067 | 11/1889 | United Kingdom | 411/387 |
| 167620 | 8/1921 | United Kingdom | 411/387 |
| 464208 | 4/1937 | United Kingdom | 411/397 |
| 8504221 | 9/1985 | World Int. Prop. O. | 411/387 |

Primary Examiner—Michael Safavi
Attorney, Agent, or Firm—Michael Ebert

[57] ABSTRACT

An anchor and stress plate assembly adapted to secure an insulation layer to the deck of a roof without penetrating the lower surface of the deck which is formed either of relatively soft or hard decking material. The anchor is provided with a flanged head and a shank whose leading section takes the form of an auger screw having a root which tapers toward the tip and a threading about the root whose crests are of approximately uniform diameter. When the anchor is turned into soft decking material, the tapered root of the auger screw then acts to pack this material into a dense mass in the region surrounding the screw to enhance the holding power of the anchor. In hard decking material, a hole must first be drilled therein to receive the auger screw whose root when the anchor is turned in fits within the hole and whose crests then cut a thread in the hole wall to securely retain the anchor. The stress plate which overlies the insulation layer to prevent uplift thereof has a central depression surrounding an opening defined by a circular series of ratchet teeth. When the anchor is fully turned into the decking material, its head then lies within the plate opening while the flange rests within the depression. The anchor head is provided with a pawl that is deflected by the ratchet teeth when the anchor is being turned in, the pawl engaging the teeth when the anchor seeks to turn out, thereby preventing loosening of the installed assembly.

13 Claims, 4 Drawing Sheets

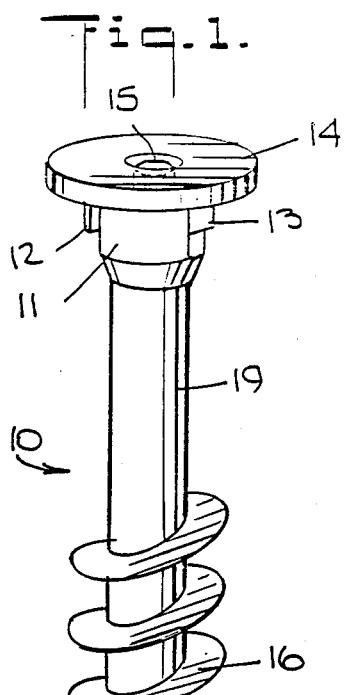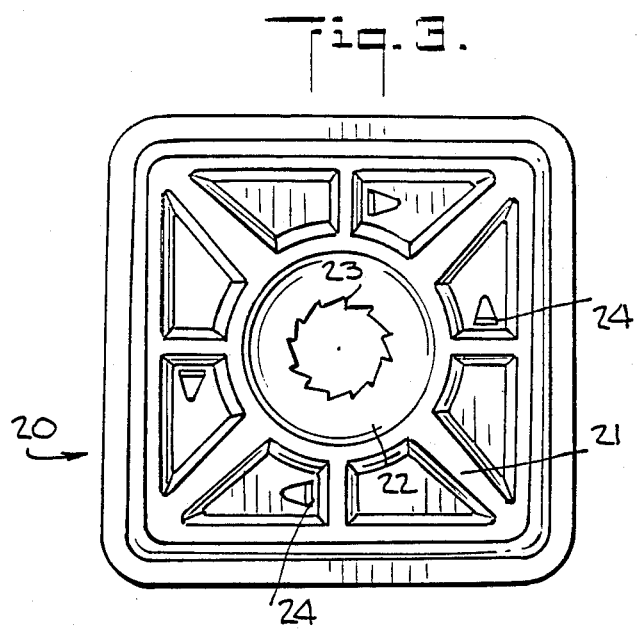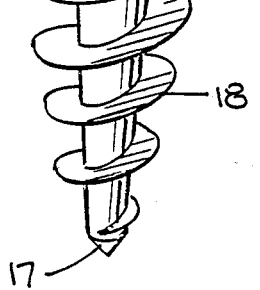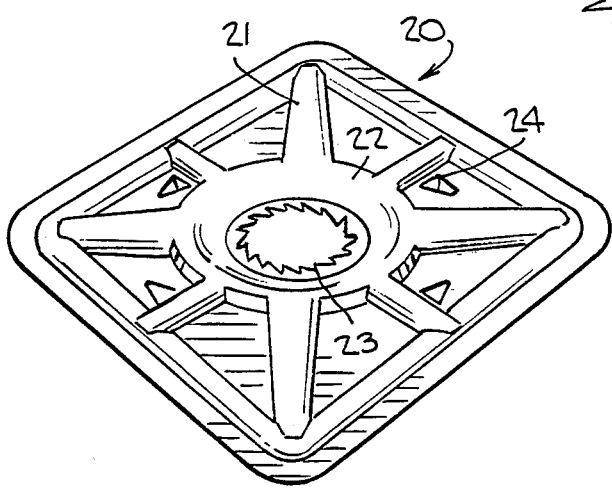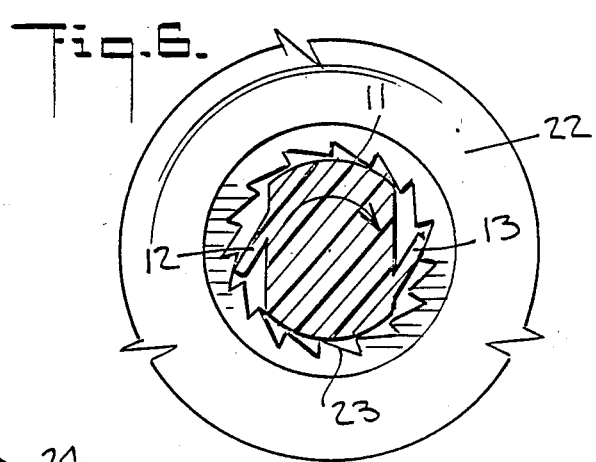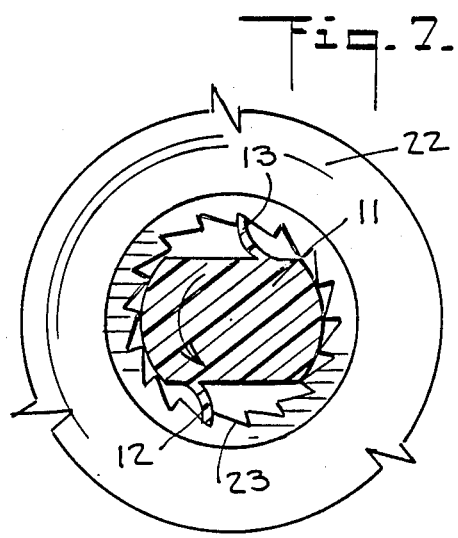

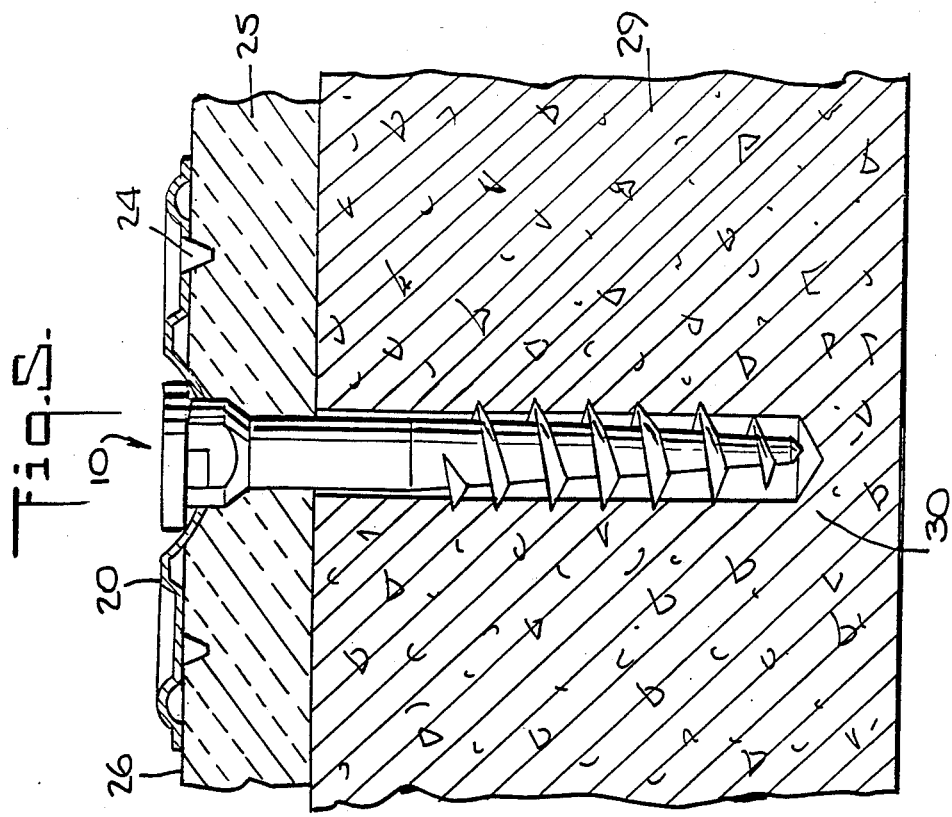
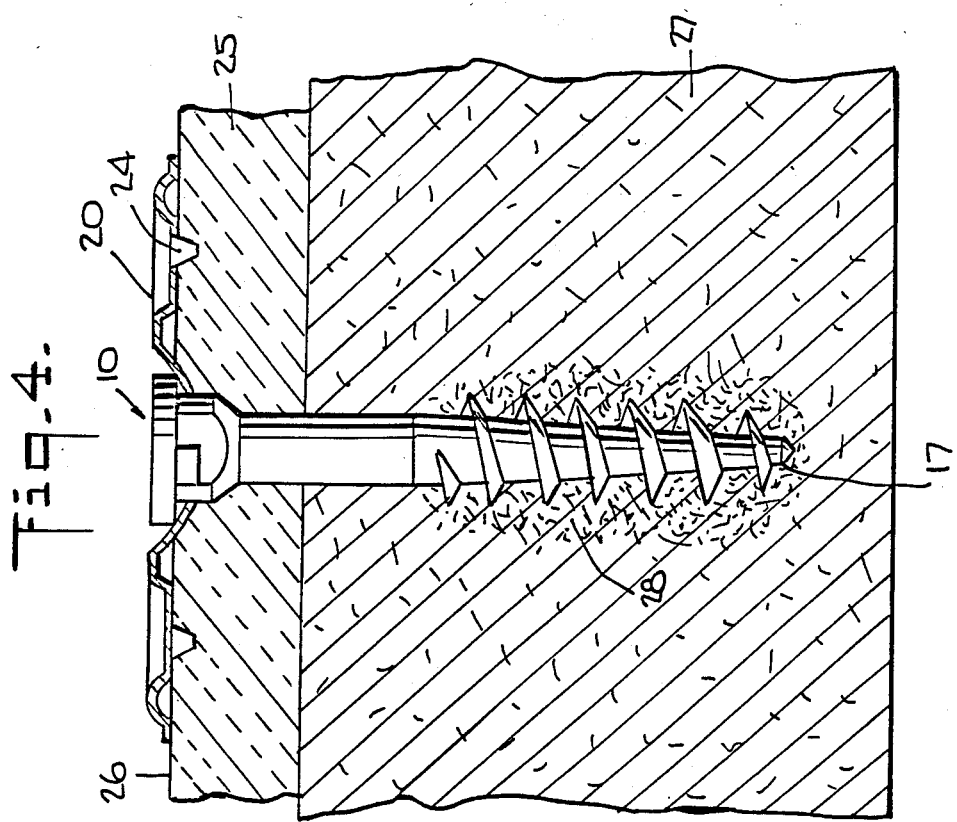

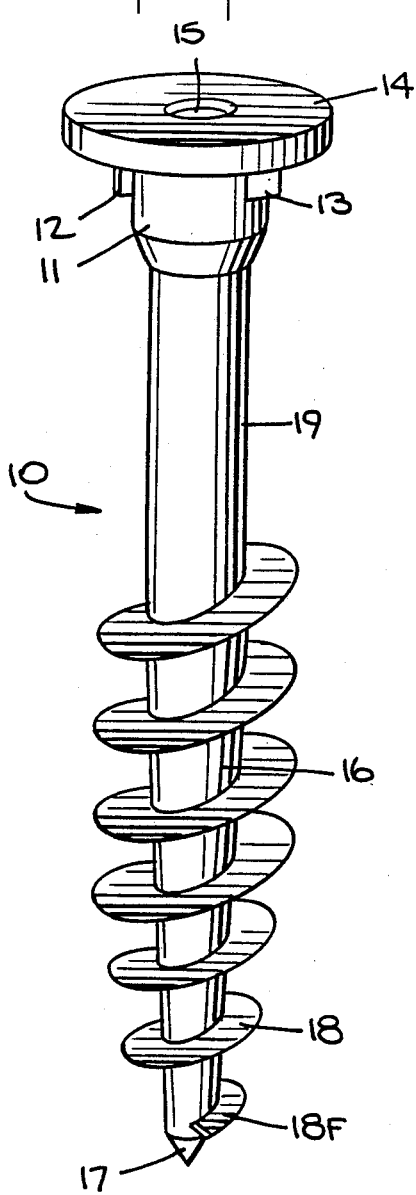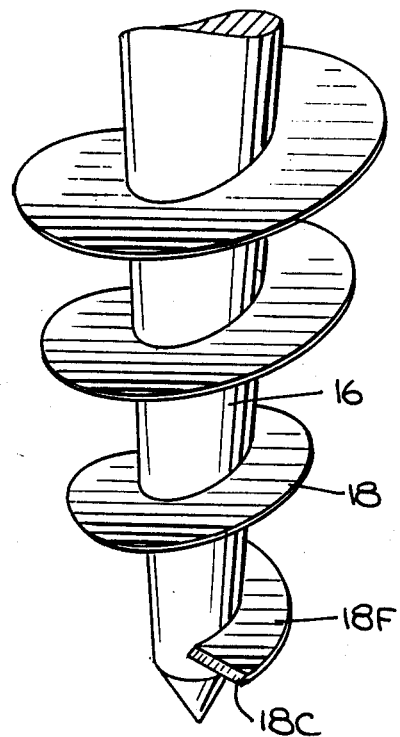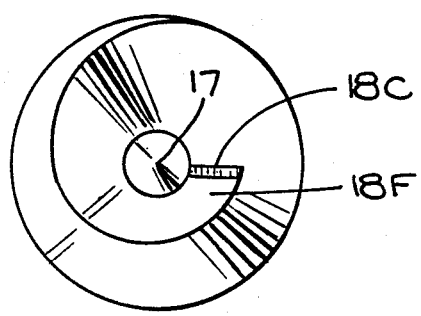

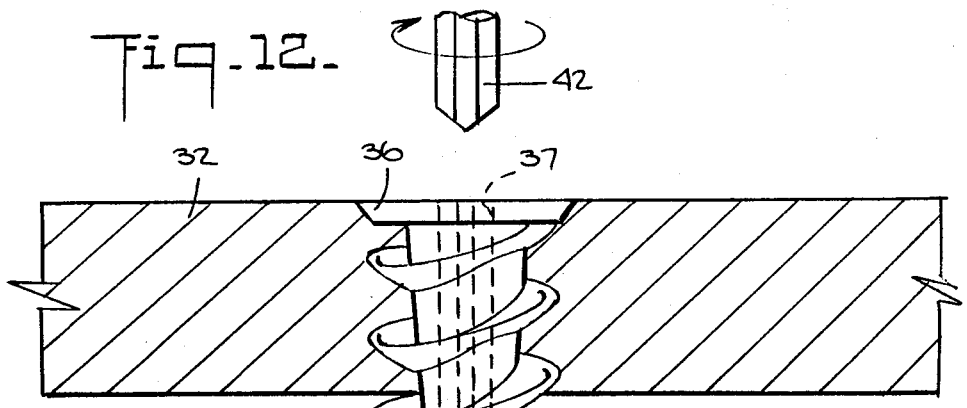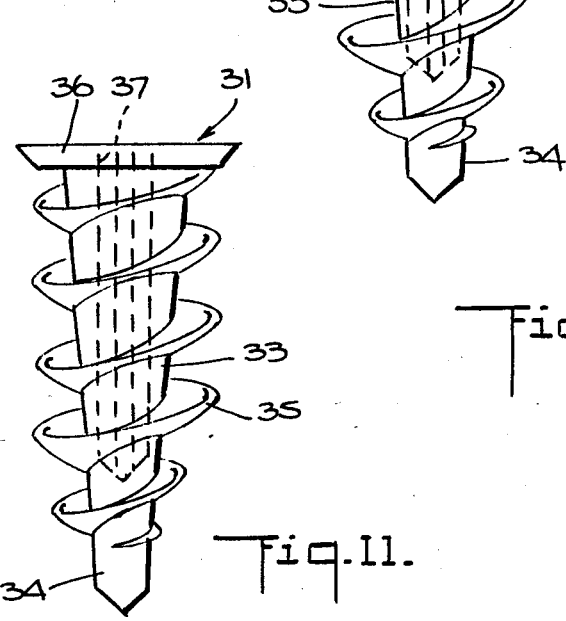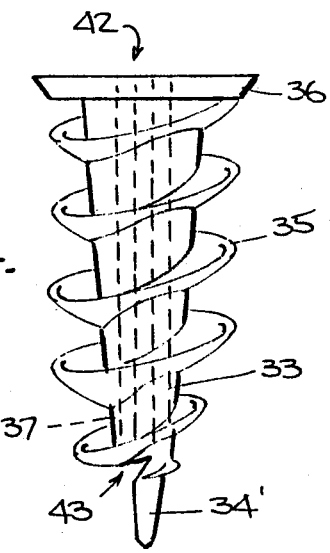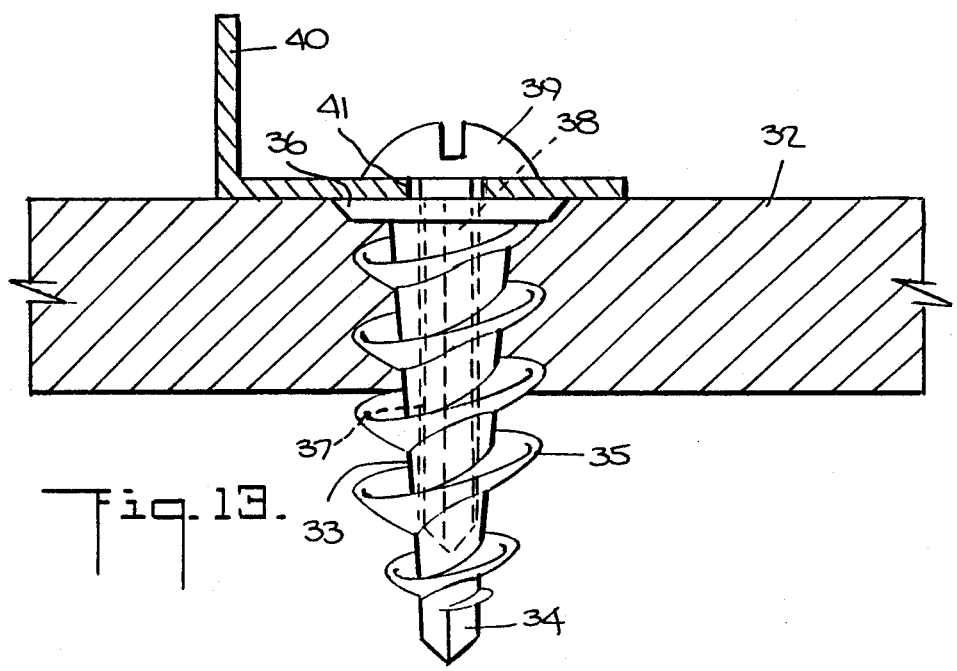

4,892,429

ROOF ANCHOR AND STRESS PLATE ASSEMBLY

Related Application: This application is a continuation-in-part of my copending application of the same title, Ser. No. 081,016filed Aug. 3, 1987.

BACKGROUND OF INVENTION

1. Field of Invention

This invention relates generally to an anchor and stress plate assembly for securing an insulation layer to the deck of a roof, and more particularly to an assembly of this type whose anchor turns into decking material but does not penetrate the underface thereof.

2. Status of Prior Art

It is common practice to cover the roof of a building with a layer of thermal insulation formed of pads or panels of lightweight material such as fiberglass or rigid foam plastic. These panels are laid down on the roof deck and covered by a sheet of polyvinyl chloride, or other water-impermeable membrane to protect the layer against water penetration.

Since the roof is exposed to the elements, it may on occasion be subject to high velocity winds as high as 150 miles per hour. Unless the insulation layer is firmly secured in place, the resultant updraft may blow the layer off the roof. For various reasons such as fire protection, the use of bonding agents to adhere the insulation layer to the deck of the roof is being discontinued, and instead mechanical fasteners are now employed to retain the layer when a strong updraft is encountered. The present practice of securing the insulation layer to the roof deck is by means of load-bearing plates of sheet metal which overlie the insulation layer and are bolted or otherwise mechanically fastened to the deck.

Among the patents which disclose load-bearing or stress plates for this purpose are the Giannuzzi U.S. Pat. No. 4,574,551 the Williams U.S. Pat. No. 1,286,862, the Sandquist U.S. Pat. No. 4,074,501 and the Carlson U.S. Pat. No. 4,288,951.

The concern of the present invention is with an anchor and stress plate assembly usable with two types of decking material. One is relatively soft, such as a porous wood and fiber composite known commercially as Tectum. The other is a hard decking material such as gypsum, plaster board, or low strength cement By "a hard decking material" is meant one which when a hole is drilled therein is capable of being tapped by an auger screw. It is important to note that such hard deck materials are also somewhat brittle and therefore subject to disintegration by an anchor screw unless the screw is of the proper type.

Conventional anchor and stress plate assemblies for these two types of decking materials usually make use of anchors of the toggle type which penetrate the material. Hence when the assembly is installed, the stress plate then engages the upper face of the insulation layer while the toggle then engages the underside of the deck. A serious practical shortcoming of this conventional arrangement is that the toggles are exposed at the underside of the deck and deprive the underside of a clean, finished appearance. When the deck underside forms the ceiling of the building interior, the presence of toggles on this ceiling is unsightly and therefore not commercially acceptable.

Another drawback is that anchors in the form of conventional toggle bolts tend to loosen up as a result of vibratory or other forces, and sometimes in doing so cause debris to fall into the interior of the building. And in loosening up, the anchor may in time fail and result in a blow off of the insulation layer held thereby.

In order to provide an assembly including a nonpenetrating anchor for soft decking materials such as Tectum, the Blucher et al. U.S. Pat. No. 4,642,012 provides an auger-like anchor whose shank is composed of three sections of different diameter, the head of the screw being received in a washer functioning as a stress plate. No means are provided in this assembly to resist loosening of the anchor.

SUMMARY OF INVENTION

In view of the foregoing, the main object of this invention is to provide an improved roof anchor and stress plate assembly of the non-penetrating type for securing a layer of insulation to a deck composed of relatively soft or hard material.

More particularly, an object of this invention is to provide an assembly of the above type in which the anchor, when the assembly is installed, is highly resistant to any force which seeks to turn out the anchor, thereby preventing loosening of the installed assembly.

Also an object of this invention is to provide an assembly whose anchor shank has an auger screw section that functions effectively in both soft and dense decking material.

A significant feature of an anchor in accordance with the invention is that when the auger screw section thereof is turned into soft, relatively low density decking material, this action causes the material to pack into a mass of increased density in the region surrounding the screw, thereby enhancing its holding power; the same auger screw when turned into a hole drilled in hard decking material allowing for easy cutting of a thread in the wall of this hole but with a minimum of crushing or pulverizing of the hard and relatively brittle material.

Yet another object of the invention is to provide an assembly of the above type which may be mass-produced at low cost, and which may be installed without difficulty by a simple torque-producing tool.

Briefly stated, these objects are attained in an anchor and stress plate assembly adapted to secure an insulation layer to the deck of a roof without penetrating the lower surface of the deck which is formed either of relatively soft or hard decking material. The anchor is provided with a flanged head and a shank whose leading section takes the form of an auger screw having a root which tapers toward the tip and a threading about the root whose crests are of approximately uniform diameter. When the anchor is turned into soft decking material, the tapered root of the auger screw then acts to pack this material into a dense mass in the region surrounding the screw to enhance the holding power of the anchor. In hard decking material, a hole must first be drilled therein to receive the auger screw whose root when the anchor is turned in fits within the hole and whose crests then cut a thread in the hole wall to securely retain the anchor.

The stress plate which overlies the insulation layer to prevent uplift thereof has a central depression surrounding an opening defined by a circular series of ratchet teeth. When the anchor is fully turned into the decking material, its head then lies within the plate opening while the flange rests within the depression. The anchor head is provided with a pawl that is deflected by the ratchet teeth when the anchor is being turned in, the pawl engaging the teeth when the anchor seeks to turn out, thereby preventing loosening of the installed assembly.

BRIEF DESCRIPTION OF DRAWINGS

For a better understanding of the invention as well as other objects and further features thereof, reference is made to the following detailed description to be read in conjunction with the accompanying drawings, wherein:

FIG. 1 is a perspective view of the anchor included in an assembly in accordance with the invention;

FIG. 2 is a perspective view as seen from the top face of the stress plate included in the assembly;

FIG. 3 is a plan view of the rear face of the stress plate;

FIG. 4 is a section taken through a layer of insulation secured to a deck of soft decking material in which the assembly is installed;

FIG. 5 is a similar sectional view in which the assembly is installed in hard decking material having a hole drilled therein;

FIG. 6 is a transverse section taken through the assembly to illustrate the relationship existing between the anchor head pawls and the ratchet teeth which define the opening in the stress plate when the anchor is being turned in;

FIG. 7 is similar to FIG. 6, but shows the relationship that arises when the anchor seeks to turn out;

FIG. 8 shows, in perspective, a modified form of anchor;

FIG. 9 is an enlarged view of the tip portion of the anchor;

FIG. 10 is an end view of the tip portion;

FIG. 11 is an elevational view of a first embodiment of an anchor of the screw-in plug type;

FIG. 12 illustrates the manner in which the plug type anchor is screwed into a substrate;

FIG. 13 shows how a fixture is secured to the face of the substrate by a holding screw received in the plug-type anchor; and FIG. 14 is an elevational view of another embodiment of an anchor of the screw-in plug type.

DESCRIPTION OF INVENTION

Referring now to FIG. 1, there is shown an anchor 10 included in a roof anchor and stress plate assembly according to the invention, anchor 10 being molded or otherwise fabricated of a synthetic plastic material of high strength such as glass-reinforced nylon or cast of a corrosion resistant zinc alloy or other suitable metal.

Anchor 10 includes a generally-cylindrical head 11 having at diametrically-opposed positions thereon flattened sides and a pair of fingers 12 and 13 which cantilevers over the respective flattened sides in opposing angular directions. Mounted on head 11 and integral therewith is a circular flange 14 whose diameter is greater than that of the head.

An axial bore extending through flange 14 and head 11 is provided with a hexagonally-shaped inner wall to define a socket 15 for receiving a similarly-shaped bit of a torque-producing tool for turning the anchor. In practice, instead of a socket, the anchor flange may be provided with a slot or slots to receive the blade of a screw driver, such as a Phillips screw driver.

Anchor 10 includes a shank whose leading section takes the form of an auger screw having a root 16 which tapers toward the tip 17. Spiralled about root 16 is a threading 18 whose crests are of approximately uniform diameter throughout the length of the leading section except for the crests adjacent tip 17. These crests are of smaller diameter to facilitate entry of the auger screw into the decking material. The trailing section 19 of the shank has a length appropriate to the thickness of the insulation layer to be secured to the deck. Trailing section 19 is of uniform diameter and is unthreaded.

Stress plate 20, as shown in FIGS. 2 and 3, is preferably formed of rust-resistant sheet metal. The plate has a square form and rounded corners, the stress plate being embossed to create a reinforcing pattern of radial spokes 21 in a manner similar to that disclosed in the Giannuzzi U.S. Pat. No. 4,574,551.

Plate 20 is provided with a circular depression 22 which surrounds a central opening defined by a circular series of ratchet teeth 23. Struck out of the plate at different positions thereon are four pointed lugs 24 which project below the plate and press into the insulating layer when plate 20 is secured thereto by the anchor. These lugs act to resist rotation of the fully installed plate.

FIG. 4 shows the installed assembly when it serves to secure a layer of insulation 25 to the surface of a deck 27 formed of soft decking material, such as Tectum. In installing the assembly, stress plate 20 is placed over insulation layer 25 and anchor 10 is then pushed through this readily penetrable insulation layer until the tip 17 of the anchor impinges on the surface of the decking material. At this point, it becomes necessary to turn the auger screw section of the anchor into the decking material.

When the anchor is fully turned in, its head 13 then lies within the opening in stress plate 20, with the flange 14 then resting on the depression 22 so that the flange is flush with the anchor plate and does not protrude thereabove. The length of the anchor is such that when it is fully turned in, tip 17 thereof is above the undersurface of the decking material and does not penetrate this material; hence the appearance of the undersurface is clean and unaffected by the installation.

When turning the auger screw into deck 27, the soft decking material thereof which is usually a wood-fiber composite of relatively low density, is then packed by the threading of the screw into a dense mass 28 which surrounds the screw and acts to improve resistance to withdrawal of the anchor.

Such packing results from the geometric relationship of the tapered root 16 of the auger screw section to the crests of the threading which are of approximately uniform diameter. As the screw advances, the decking material in the region surrounding the relatively small diameter root at the lower end portion of the auger screw is progressively compressed. This progressive compression gives rise to an increased density in the decking material while keeping to a minimum the rupturing of the fibrous elements thereof and thereby maintaining the integrity of the material. The densified mass of soft decking material in the region surrounding the auger screw results in a significant increase in holding strength. This advantage is lacking in an ordinary auger screw.

As shown in FIG. 6, when head 11 of the anchor lies within the opening in stress plate 20 and the anchor is being turned in clockwise, then fingers 12 and 13 which project from opposite sides of head 11 are engaged by the ratchet teeth 23 which surround the openings.

But when, as shown in FIG. 7, vibratory or other forces seek to turn the anchor out counterclockwise, then fingers 12 and 13 are engaged by the ratchet teeth of the stress plate. Because stress plate 20 is prevented by its lugs 24 from rotating, the anchor is then not permitted to turn counterclockwise and the installation is prevented from loosening.

The installation illustrated in FIG. 5 differs from that in FIG. 4, for now the decking material 29 is relatively hard and brittle, not soft. In order to turn anchor 10 into this hard material, one must first create a hole 30 therein. The diameter of hole 30 is about the same as or is slightly greater than that of the trailing section 19 of the anchor and is therefore smaller than the approximately uniform diameter of threading crest 18.

Hence when the auger screw of anchor 10 is turned into drilled hole 30, the root fits in a hole, whereas the crests of the screw then proceed to cut a thread in the hard decking material while keeping to a minimum the pulverizing or crushing of this brittle material Here again the anchor, when fully turned in, does not go through the decking material, yet it is strongly anchored therein to resist withdrawal even when subjected to very heavy pull out forces of the type encountered in roof installations.

It is to be understood that an anchor in accordance with the invention has practical applications apart from those specifically disclosed herein. The anchor need not be used in conjunction with a stress plate of the type illustrated, but may be used with other types of stress plates or without a stress or load bearing plate, for the anchor can be used to advantage in either a soft or hard decking or other material. And while the anchor and stress plate assembly has been described as applicable to roof installations, it is also applicable to other installations. Thus the assembly is usable to secure panels of various types to side walls or other structural members.

Modified Anchor:

In the anchor shown in FIG. 1, the leading section of its shank takes the form of an auger screw whose root tapers toward the tip approximately the full length of this section. The helical threading surrounding the root is formed by convolutions whose crests are of approximately uniform diameter along substantially the full length of the leading section, except for the convolutions of the threading adjacent the tip. The final convolution, as it approaches the tip, decreases in diameter until it attains nearly the diameter of the root at the point where it merges with the root.

When an anchor of the type shown in FIG. 1, is turned into soft decking material such as Tectum or a low density wood-like composite, it experiences little difficulty in biting into and entering this material. But when the anchor is to be screwed into an existing old roof which is more resistant to a screw action, the final convolution of the threading adjacent the tip is incapable of cutting into this material unless there is a hole therein of sufficient diameter to accept the tip and to permit the final convolution to bite into the wall of the hole. It is for this reason that when one encounters a substrate which resists entry of the anchor, that the present practice is to pre-drill or pre-punch a hole therein to facilitate such entry.

Where installation requirements are such that hundreds, if not thousands, of anchors are called for, the need to predrill or pre-punch holes in a screw-resistant roof or other substrate adds significantly to labor costs and the time it takes to complete an installation.

In the modified anchor in accordance with the invention shown in FIGS. 8, 9 and 10, the final convolution 18F of the helical threading of the auger screw surrounding tapered root 16 ends abruptly in a sharp cutting edge 18C which extends laterally from the root adjacent tip 17. This cutting edge preferably has a chisel-like formation.

Hence, when this anchor is turned into a screw-resistant substrate such as an existing old roof, cutting edge 18C at the leading end of the helical threading on the auger screw cuts into the substrate to facilitate entry of the screw therein, thereby obviating the need for pre-punching or pre-drilling a screw entry hole.

A modified anchor of the type shown in FIGS. 8, 9 and 10 has practical applications by no means limited to roofing. This anchor, while useful in combination with a stress plate as previously disclosed, may also be used without a stress plate. The modified anchor is usable in materials that are otherwise resistant to a conventional auger screw anchor, such materials including tightly-bonded porous or granular material or even hard ground. Thus, the modified anchor can be used as a ground stake to hold down tent strappings or to attach fixtures to wood that is otherwise not receptive to ordinary screws.

Where the modified anchor is to be used as a fastener without a stress plate in an assembly as disclosed hereinabove, the head of the fastener need not then have pawls or fingers 12 and 13 to engage ratchet teeth on the stress plate. The head then may be in any form appropriate to the end use of the fastener, the head being adapted to be engaged by a torque-producing tool such as a screw driver.

As pointed out previously, the tapered root of the leading section of the anchor, in the case of a soft substrate, acts to pack the substrate material, as the screw is turned therein, into a dense mass in the region surrounding the screw to enhance the holding power of the anchor. It is not essential to the invention that the taper be linear, for the taper may also be curvilinear or in incremental steps, as long as the root diameter is reduced in substantially a progressive manner as one goes from the upper end of the leading section to the tip of the anchor. And the head of the anchor may be provided with an integral flange of enlarged diameter which bears against the surface of the substrate to function as a bearing or stress plate.

Plug-Type Anchors

In the embodiments of the fasteners or anchors shown in FIGS. 1 and 8, the threaded shanks are fabricated of solid metal or high-strength plastic material, and the anchors are provided with a head that is engageable by a torque-producing tool to screw the shank into a substrate. When an anchor of this type is installed, the head thereof then serves to secure to the face of the substrate a fixture, a bracket, or any other device having a mounting hole therein to accommodate the shank.

In the embodiment of the anchor shown in FIGS. 11, 12 and 13, the anchor is of a screw-in plug type formed of metal or molded of high-strength, synthetic plastic material such as nylon or polypropylene. This plug-type anchor, generally identified by numeral 31, is screwable into a substrate 32 which may be plywood, plasterboard, fiberboard or any other material used in hollow wall construction. Of prior art interest in this regard is the Ernst et al. U.S. Pat. No. 4,601,625.

Plug-type anchor 31 is provided with a tapered body 33 that terminates in a drill tip 34. Body 33 defines the tapered root of a screw having a helical threading 35, the crests of whose convolutions are of approximately uniform diameter along substantially the full length of the body except for convolutions adjacent tip 34. The final convolution, as it approaches tip 34, decreases in diameter until it attains nearly the diameter of the root at the point where it merges with the root.

The head of the plug is defined by a collar 36 having a truncated conical form, the collar being flush with the face of the substrate when the plug is fully screwed therein.

As with the previous embodiments, the relationship of the tapered root to the threading whose crests are of approximately uniform diameter is such as to cause packing of the substrate material to produce a densified mass in the region surrounding the plug body to resist withdrawal of the plug. And while not shown in FIGS. 11 to 13, in practice the final convolution of the threading surrounding the tapered root may be formed to end abruptly in a chisel-like cutting edge to facilitate entry of the screw-type plug into the substrate.

The plug is provided with a longitudinal bore 37 adapted to receive a mounting screw 38 having a head 39. This screw serves to hold a bracket 40 or any other fixture having a mounting hole 41 therein through which the mounting screw passes. When the mounting screw is fully turned into the plug bore, its head then engages the bracket. In practice, the mounting screw may be self-tapping; but if the plug is intended for a machine screw, the bore 37 in the plug is internally threaded to receive this screw.

Also, in practice, body 33 of the plug may be longitudinally slotted so that as a mounting screw 38 is screwed therein, the plug is caused to expand to more firmly anchor the plug in the substrate. In this instance, the diameter of the screw exceeds that of the bore so that as it is screwed therein, it forces the body of the plug outwardly.

The hollow interior of the plug-type anchor or its collar is provided with a cruciform slot or other shape so as to receive a torque-producing tool 42, as shown in FIG. 12, such as an electric screw driver with a Phillips bit. With this tool, the plug engaged thereby is rotated to cause the plug tip 34 to drill a lead hole in the substrate, the plug then threading itself into the substrate until it comes to rest with its collar 36 lying flush with the face of the substrate. Bracket 40 or whatever other fixture or device to be fastened is then placed with its mounting hole 41 in registration with plug bore 37. Mounting screw 38 is then inserted in the mounting hole of the bracket and screwed into plug bore 37 to secure the bracket to the face of the substrate. This action may be carried out using the same electric screw driver and bit for this purpose that was used to install the plug.

Thus, by means of the self-drilling anchor of the screw-plug type, the torque-producing tool used to install the anchor serves also to screw the mounting screw into the installed plug, thereby making possible a fast and economical installation procedure.

Another significant advantage of this plug-type anchor is that should it become necessary to take off the fixture fastened to the substrate and also to remove the anchor from the substrate, this is readily accomplished by first removing the mounting screw 38 to release the fixture, and then screwing out the plug from the substrate, the same tool being used for both actions.

In the plug-type anchor shown in FIGS. 11 to 13, the length of mounting screw 38 must be appropriate to the length of bore 37 in the plug plus the thickness of the fixture to be fastened to the substrate. In order to avoid this specific requirement and make it possible to use the anchor with mounting screws of various lengths, the plug-type anchor 42 shown in FIG. 14 is provided with a notch 43 which communicates with bore 37 at the point where the bottom of the bore is adjacent drill tip 34', this tip being partially cut away to create an exit for a mounting screw passing through the bore.

In this way, should the length of the mounting screw used to fasten the fixture exceed a length representing the sum of the thickness of the fixture and the length of the bore, the mounting screw will exit through notch 43. Thus, the user is not required to use a mounting screw of predetermined length, but may use mounting screws having lengths which more or less exceed the predetermined length yet serve the required function.

It is to be noted that when the plug has an internally threaded bore in which is received a mounting screw, the head of the mounting screw which is adapted to be engaged by a screw driver may be used when the mounting screw is in place, to screw in the plug, there being no need in this instance to shape the bore of the collar of the plug so that it can be engaged by the blade or bit of a torque-producing tool. In this case, after the plug is screwed in the substrate, the mounting screw is turned out so that it can be re-mounted to hold the fixture.

While there have been shown and described preferred embodiments of an anchor and stress plate assembly in accordance with the invention and of screw-type anchors having a tapered root and convolutions of approximately uniform crest diameter, it will be appreciated that many changes and modifications may be made therein without, however, departing from the essential spirit thereof. Thus, instead of a sheet metal stress plate, the plate may be made of plastic material of high strength.

I claim:

1. An anchor for use in either relatively soft or hard material, said anchor comprising a head and a shank having a section of predetermined length constituted by a screw terminating in a tip at the end of the shank, said screw being defined by a root which tapers toward the tip along substantially the full length of the section and a threading formed by a series of convolutions whose crests are of essentially the same diameter along substantially the full length of the section except for the convolutions thereof adjacent the tip including a final convolution in the series.

2. An anchor as set forth in claim 1, wherein the root has a geometric relationship to the threading such that when the screw is turned into said soft material, the material is caused to pack to produce a dense mass in a region surrounding the screw to resist withdrawal of the anchor.

3. An anchor as set forth in claim 1, wherein the root has a geometric relationship to the threading such that when the screw is turned into a hole in said hard material, the root fits into the hole and the crests of the threading cut a thread in the wall of the hole.

4. An anchor as set forth in claim 1, wherein the final convolution ends abruptly in an edge which extends laterally from the root adjacent the tip and is adapted to enter into a material that is otherwise resistant to screw entry.

5. An anchor as set forth in claim 4, wherein said edge has a chisel-like formation.

6. An anchor as set forth in claim 1, wherein said head is in a form adapted to be engaged by a torque producing tool.

7. An anchor as set forth in claim 6, wherein said head has a bore therein forming a socket for receiving said tool.

8. An anchor as set forth in claim 1 for attaching a fixture having a mounting hole therein to a face of a substrate formed of said soft or hard material, said shank being constituted by a plug having a tapered formation to define the tapered root of the screw, said head being constituted by a collar at an upper end of the plug, said anchor having a longitudinal bore therein to receive a mounting screw for attaching the fixture to the substrate.

9. An anchor as set forth in claim 8, wherein said plug is provided at a lower end with a tip in a drill formation to drill a lead hole in said substrate.

10. An anchor as set forth in claim 8, wherein said anchor bore is shaped to receive a torque-producing tool to screw the plug into the substrate.

11. An anchor as set forth in claim 8, molded of high-strength, synthetic plastic material.

12. An anchor as set forth in claim 8, wherein said bore is internally-threaded to receive said mounting screw.

13. An anchor as set forth in claim 8, wherein a portion of said bore is unthreaded to receive a self-tapping mounting screw.

* * * * *